US011158001B2

(12) United States Patent
Green et al.

(10) Patent No.: US 11,158,001 B2
(45) Date of Patent: Oct. 26, 2021

(54) SYSTEMS AND METHODS FOR SIMULTANEOUS PLACEMENT OF AN ORDER OBJECT IN MULTIPLE ORDER BOOKS OF AN AUTOMATED EXCHANGE SYSTEM

(71) Applicant: NASDAQ TECHNOLOGY AB, Stockholm (SE)

(72) Inventors: Anders Green, Södertälje (SE); Sebastian Tomac, Stockholm (SE)

(73) Assignee: NASDAQ TECHNOLOGY AB, Stockholm (SE)

( * ) Notice: Subject to any disclaimer, the term of this patent is extended or adjusted under 35 U.S.C. 154(b) by 145 days.

(21) Appl. No.: 16/155,819

(22) Filed: Oct. 9, 2018

(65) Prior Publication Data
US 2019/0108587 A1    Apr. 11, 2019

Related U.S. Application Data

(60) Provisional application No. 62/569,685, filed on Oct. 9, 2017.

(51) Int. Cl.
*G06Q 40/04* (2012.01)
*H04L 29/08* (2006.01)
*G06Q 40/06* (2012.01)

(52) U.S. Cl.
CPC ............ *G06Q 40/04* (2013.01); *G06Q 40/06* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 9,792,164 B1* | 10/2017 | Millhuff | ................ | G06Q 40/04 |
| 9,836,791 B2* | 12/2017 | Jensen | ................ | G06Q 40/06 |
| 9,929,743 B1* | 3/2018 | Acuna-Rohter | ........ | H04L 51/18 |
| 10,262,365 B2* | 4/2019 | Venkataraman | ....... | G06Q 40/06 |
| 10,311,513 B2* | 6/2019 | Prakoso | ................. | G06F 16/22 |
| 10,846,795 B2* | 11/2020 | Kodde | ................... | G06Q 40/04 |
| 2004/0054630 A1* | 3/2004 | Ginter | ................. | H04N 21/443 |
| | | | | 705/53 |
| 2006/0026090 A1* | 2/2006 | Balabon | ................ | G06Q 40/04 |
| | | | | 705/37 |
| 2006/0085321 A1* | 4/2006 | Staib | ...................... | G06Q 30/08 |
| | | | | 705/37 |
| 2006/0282369 A1* | 12/2006 | White | .................... | G06Q 30/08 |
| | | | | 705/37 |

(Continued)

OTHER PUBLICATIONS

Schroeter, J. "Limit Order Book reconstruction, visualization and statistical analysis of the order flow". Master's Thesis. Swiss Fed Inst of Tech (ETH). Zurich. May 31, 2014. (Year: 2014).*

(Continued)

*Primary Examiner* — Ayal I. Sharon
(74) *Attorney, Agent, or Firm* — Nixon & Vanderhye, PC

(57) ABSTRACT

The technology described herein relates to an automated marketplace system for exchanging tradeable instrument(s). In particular, the technology described herein relates to an automated exchange system that simultaneously places order objects in multiple order book memories and updates orders that are stored in the multiple order book memories for consistency.

18 Claims, 7 Drawing Sheets

(56) References Cited

U.S. PATENT DOCUMENTS

| | | | |
|---|---|---|---|
| 2008/0120129 A1* | 5/2008 | Seubert | G06Q 10/10 705/35 |
| 2008/0243811 A1* | 10/2008 | He | G06F 16/334 |
| 2010/0082495 A1* | 4/2010 | Lutnick | G06Q 40/04 705/80 |
| 2010/0082500 A1* | 4/2010 | Lutnick | G06Q 40/06 705/36 R |
| 2012/0089496 A1* | 4/2012 | Taylor | G06Q 40/00 705/35 |
| 2013/0030963 A1* | 1/2013 | Cramer | G06Q 40/02 705/30 |
| 2014/0149273 A1* | 5/2014 | Angell | G06Q 40/04 705/37 |
| 2015/0073967 A1* | 3/2015 | Katsuyama | G06Q 30/08 705/37 |
| 2015/0081508 A1* | 3/2015 | Schwall | G06Q 40/04 705/37 |
| 2015/0095207 A1* | 4/2015 | Kodde | G06Q 40/04 705/37 |
| 2015/0356679 A1* | 12/2015 | Schmitt | G06Q 40/04 705/37 |
| 2016/0078538 A1* | 3/2016 | Katsuyama | G06Q 40/04 705/37 |
| 2016/0078539 A1* | 3/2016 | Ignatovich | G06Q 40/04 705/37 |
| 2017/0018031 A1* | 1/2017 | Bandy | G06F 16/22 |
| 2017/0243291 A1* | 8/2017 | Konduru | G06Q 40/04 |
| 2017/0293974 A1* | 10/2017 | Konduru | G06Q 40/04 |
| 2017/0331774 A1* | 11/2017 | Peck-Walden | H04L 51/18 |
| 2018/0075530 A1* | 3/2018 | Kavanagh | G06F 12/0646 |
| 2018/0121103 A1* | 5/2018 | Kavanagh | G06F 3/067 |
| 2018/0176320 A1* | 6/2018 | Soni | G06F 11/1474 |
| 2018/0191624 A1* | 7/2018 | Haynold | H04L 47/33 |
| 2018/0268481 A1* | 9/2018 | Bonig | G06Q 40/06 |
| 2018/0268482 A1* | 9/2018 | Bonig | G06Q 40/06 |
| 2018/0276751 A1* | 9/2018 | Kavanagh | H04L 69/16 |
| 2018/0349898 A1* | 12/2018 | Ayikara Kizhakayil | G06F 21/34 |
| 2019/0005582 A1* | 1/2019 | Kapur | G06Q 40/04 |
| 2019/0044836 A1* | 2/2019 | Kavanagh | H04L 43/02 |
| 2019/0108004 A1* | 4/2019 | Kavanagh | G06F 11/3476 |
| 2019/0108247 A1* | 4/2019 | Kavanagh | G06F 16/2474 |

OTHER PUBLICATIONS

Mohammadpur et al. "Efficient Reusable Collections." IEICE Trans. Inf. & Syst., vol. E101-D, No. 11. Nov. 2018. https://search.ieice.org/bin/summary.php?id=e101-d_11_2710 (Year: 2018).*

Programmer Sought. "The application of the linked list—multiple linked lists". Printed Jun. 18, 2021. https://www.programmersought.com/article/3820179828/ (Year: 2021).*

Wikipedia. "Doubly linked list". Jan. 31, 2017. https://en.wikipedia.org/w/index.php?title=Doubly_linked_list&oldid=762931767 (Year: 2017).*

* cited by examiner

| Average daily turnover (ADT) in EUR | ADT < 50 000 | 50 000 ≤ ADT < 100 000 | 100 000 ≤ ADT < 500 000 | 500 000 ≤ ADT < 1 mill | 1 mill. ≤ ADT < 5 mill. | 5 mill. ≤ ADT < 25 mill. | 25 mill. ≤ ADT < 50 mill. | 50 mill. ≤ ADT < 100 mill. | ADT ≥ 100 mill. |
|---|---|---|---|---|---|---|---|---|---|
| Minimum size of orders qualifying as large in scale compared with normal market size in EUR | 15 000 | 30 000 | 60 000 | 100 000 | 200 000 | 300 000 | 400 000 | 500 000 | 650 000 |

| 501 | 502 | 503 | 504 |
| --- | --- | --- | --- |
| Order Id | Lit | DARK | AUCTION |
| 1 | 1000@100 | 1000@100 | 1000@100 |

| Order Id | Lit | DARK | AUCTION |
| --- | --- | --- | --- |
| 1 | 1000@101 | 1000@101 | 1000@101 |

| Order Id | Lit | DARK | AUCTION |
| --- | --- | --- | --- |
| 1 | 700@101 | 700@101 | 700@101 |

| Order Id | Lit | DARK | AUCTION |
| --- | --- | --- | --- |
| 1 | 700@ -101 suspended | 700@ -101 suspended | 700@101 – participating in a AOD auction. |

FIG. 5D

| 550 | | | |
|---|---|---|---|
| If | Lit 502 | DARK 503 | AUCTION 504 |
| If MOBO is executed in the Lit book, and stub falls below LIS (551) | Stub falling below LIS may stay in the Lit book. | Stub may stay if DVC not applies. Stub will be removed from book if DVC applies. | Stub will stay in AUCTION |
| If MOBO is executed in the DARK book, and stub falls below LIS (552) | Stub falling below LIS will be removed from the book, and cannot continue to be hidden. | Stub falling below LIS may stay in the DARK book. | Stub will stay in AUCTION |
| If MOBO is executed in the AUCTION book, and stub falls below LIS (553) | Stub falling below LIS will be removed from the book, and cannot continue to be hidden. | Stub may stay if DVC not applies. Stub will be removed from book if DVC applies. | Stub will stay in AUCTION |

FIG. 5E

SYSTEMS AND METHODS FOR SIMULTANEOUS PLACEMENT OF AN ORDER OBJECT IN MULTIPLE ORDER BOOKS OF AN AUTOMATED EXCHANGE SYSTEM

RELATED APPLICATION

This application claims the benefit of priority of U.S. Provisional Application No. 62/569,685 filed Oct. 9, 2017, the entire content(s) of which is incorporated herein by reference.

TECHNICAL OVERVIEW

The technology described herein relates to an automated marketplace system for exchanging tradeable instrument(s). In particular, the technology described herein relates to an automated exchange system that simultaneously places order objects in multiple order book memories and updates orders that are stored in the multiple order book memories for consistency.

INTRODUCTION

Technology is available for accepting order data messages and then processing the messages such that data from the message is stored in an order book memory (e.g., of an exchange system). For example, certain systems can receive an order data message from an entity (e.g., a broker) and the system can then process the message and store the data into an order book memory. The technology also is capable of supporting several different types of order book memories where data from different orders may be placed in a respective order book memory.

While many advances in this domain have been achieved over the years, it will be appreciated that new and improved techniques, systems, and processes in this domain are continually sought after.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

SUMMARY

The technology described herein addresses the problems in conventional technology, in part, by processing electronic order data messages so that they can be simultaneously stored and processed across multiple different order book memories. In particular, the technology receives an incoming data message including an order instruction (e.g., to trade a financial instrument) and then determines whether the order instruction included in the received message meets a pre-defined criteria. Based on this determination, the system can submit the received order instruction to multiple different order books simultaneously by referencing the same order object. In one example, each order book includes a list of references to specific order objects. In doing so, the technology introduces new functionality for processing data representing transactions in financial interest without impairing the throughput within an automated exchange system.

This Summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

FIG. 4 shows a non-limiting example table for determining whether an order can be eligible for storage in multiple order books;

FIGS. 5A-E show non-limiting example methods and scenarios related to processing orders that are currently stored in multiple order books;

DETAILED DESCRIPTION

Figure 1:
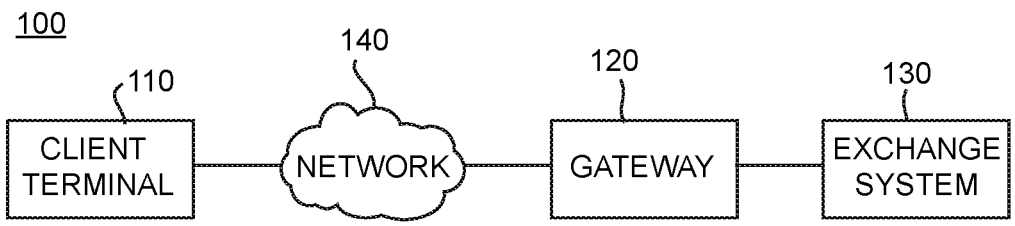
FIG. 1 shows a non-limiting example block diagram of a system for processing order data.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

The technology described herein relates to, among other topics, a system for simultaneously placing order objects in multiple order book memories and updating orders that are stored in the multiple order book memories. In one example, electronic exchange systems allow different entities (e.g., brokers, traders) to conduct trading in various instruments including security instruments. Once a transaction is initiated by a broker, trader or other entity, the entire process, including the matching of buyers and sellers and the completion of the transaction, can be performed electronically. These electronic exchange systems enable large numbers (e.g., several hundred thousands to millions) of trades to execute during a trading day. Many of these trades are completed almost instantaneously (e.g., a fraction of a millisecond) upon a buy or sell order being input to the exchange system and/or the input bid or offer prices matching the market price.

Developments of fully automated exchange platforms have created disparities between different types and categories of participating parties, including their various needs, expectations and goals. An automated exchange typically receives signals comprising order data messages, in the form of data messages, from external devices used by traders, or brokers. Traders or brokers, submit orders and/or quotes (or alterations/cancellations) to the automated exchange for purposes of trading.

The orders/quotes may relate to buying and/or selling of any type of financial instrument. In particular, the signal comprising an order data message, which is received by the automated exchange, can be an order data message that represents the placing of a new bid or sell order, or a new quote. The order data message can also represent the change of an existing bid or sell order, or a quote. In addition, the order data message can represent a cancellation/change of an existing bid or sell order or quote.

The automated exchange systems can include one or several order book memories. An order book typically comprises one or more lists of order instructions, wherein each order instruction is usually characterized by its order type, e.g. order size, order price and/or order time. In each order book, the lists of order instructions are sorted. That is, order instructions have a certain priority in each order book. The priority may, for instance, be dependent on order reception time, order price and/or order size, among other factors.

As previously mentioned, there exists a need for different types of venues and platforms for trading of financial instruments, both private and public in its nature, and combinations thereof. As a result, order books within an automated exchange system may, for example, be of different types, such as e.g. dark order books, lit order books, and auction order books. There also exist various forms of hybrid and other order books.

In one non-limiting example, a dark order book comprises a data set, representing executable proposed transactions (i.e. order instructions) in financial instruments, in which the order instructions may be placed without being broadcast as updates and/or otherwise being visible, or available, to other marketplace participants. A lit order book, for example, can provide all marketplace participants with order transparency for a set of price levels, price discovery, and/or priority.

One drawback in the conventional automated exchange systems is that an order instruction can only exist in one order book at a time. Matching, modifying, adding, or removing (commonly referred to as an event) order instructions is consequently done atomically, on a per order-book basis. Thus, an event may only impact one order-book at a time. If a reference to an order instruction is present in multiple order-books, parallel processing will be hindered in order to prevent simultaneous update of the order instruction.

The technology in this application is directed to receiving an incoming data message including an order instruction to trade a financial instrument and determining whether the order instruction included in the received message meets a specified criteria. Upon this determination, the technology submits the received order instruction, by use of references, to multiple order books simultaneously referencing the same order object.

The various aspects and embodiments described herein provide for a novel and improved method of placing electronic representations of order instructions in order books of an automated exchange system. By placing order instructions in multiple order books (i.e., two or more order books), it is possible to improve the functionality of the automated exchange while overall performance is retained. With this configuration, whenever an incoming order instruction matches against another existing order in an order book the order object is immediately updated and as a result all order instructions in all of the parallel order books will point at the same updated order object. Such an approach precludes any possible "over-fill" and also precludes the display of over-represented liquidity in the aggregated order books. Moreover, this approach advantageously allows the system to maintain orders in multiple different order book memories in a manner that does not result in latency issues within the system and maintains data integrity across all of the order book memories.

Figure 2:
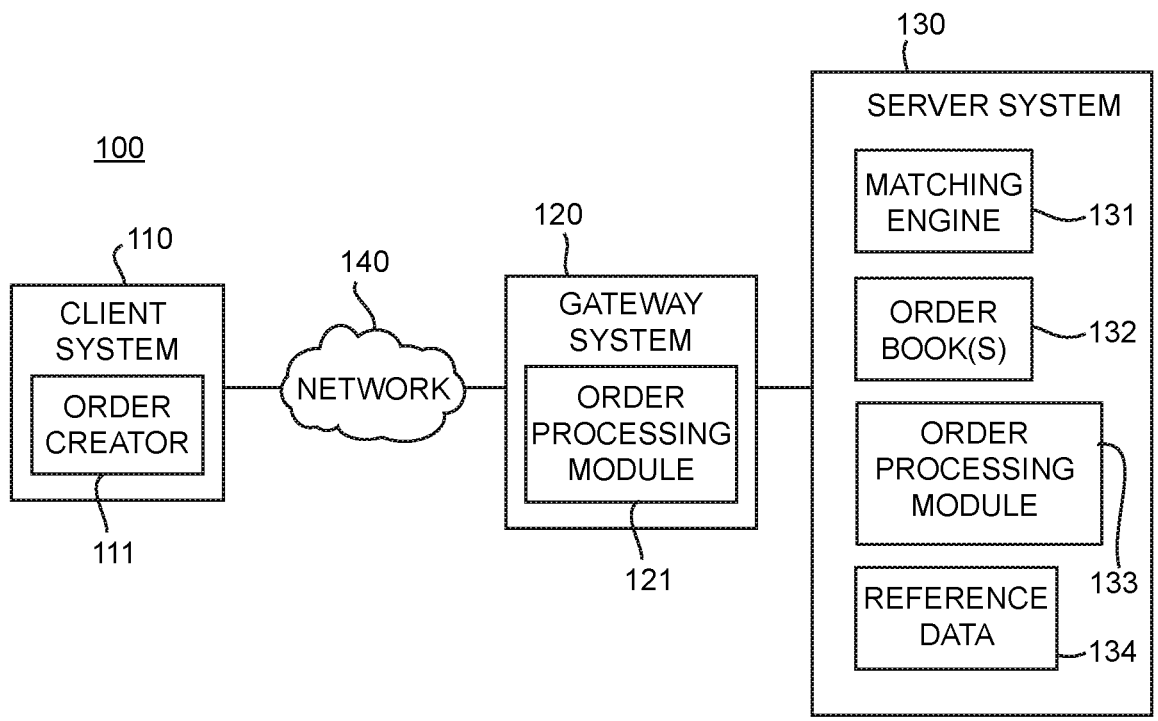
FIG. 2 shows a non-limiting example diagram of a system wherein the framework for processing order data and storing orders across multiple order books can be implemented.
Figure 3A:
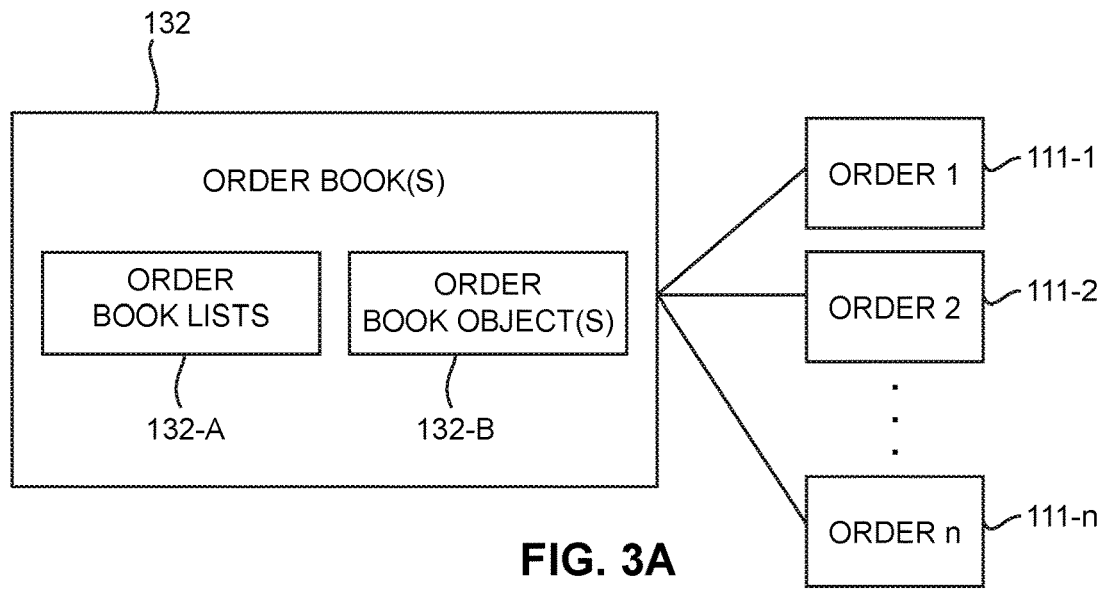
FIGS. 3A and 3B shown non-limiting example data structures for the order book(s) and order objects.
Figure 3B:
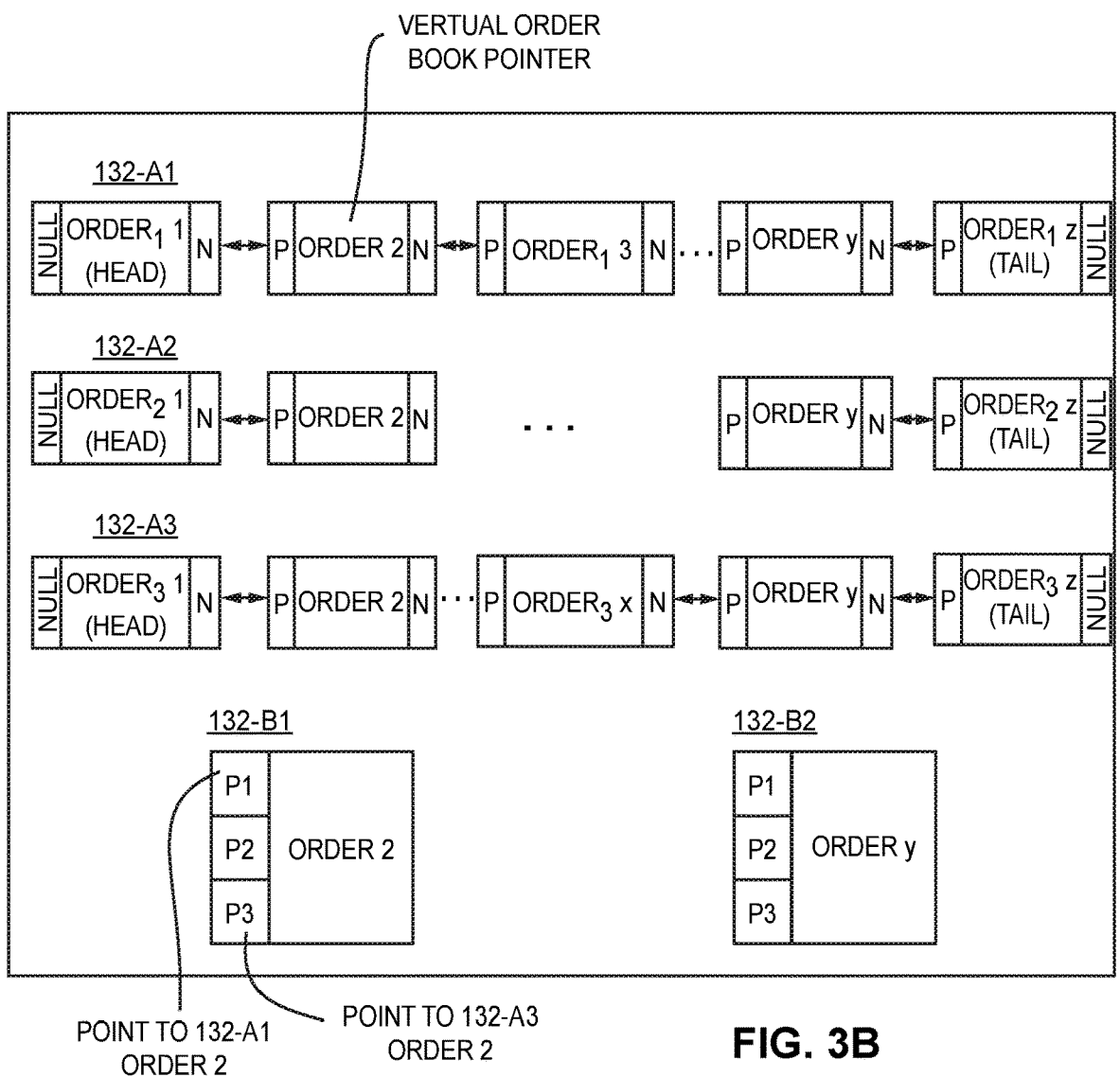
Figure 6:
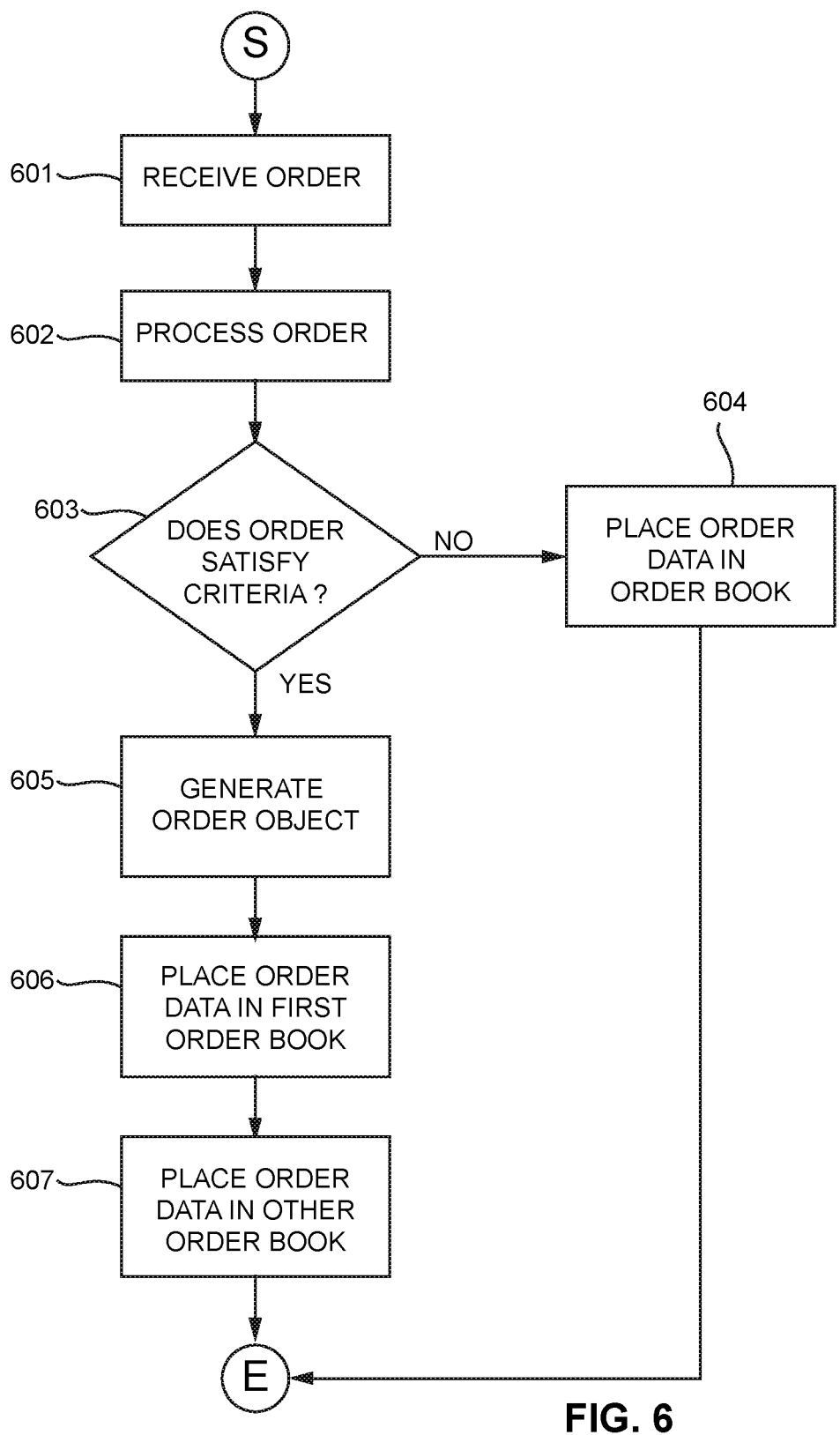
FIG. 6 shows a non-limiting example flowchart for various processes carried out by the system.
Figure 7:
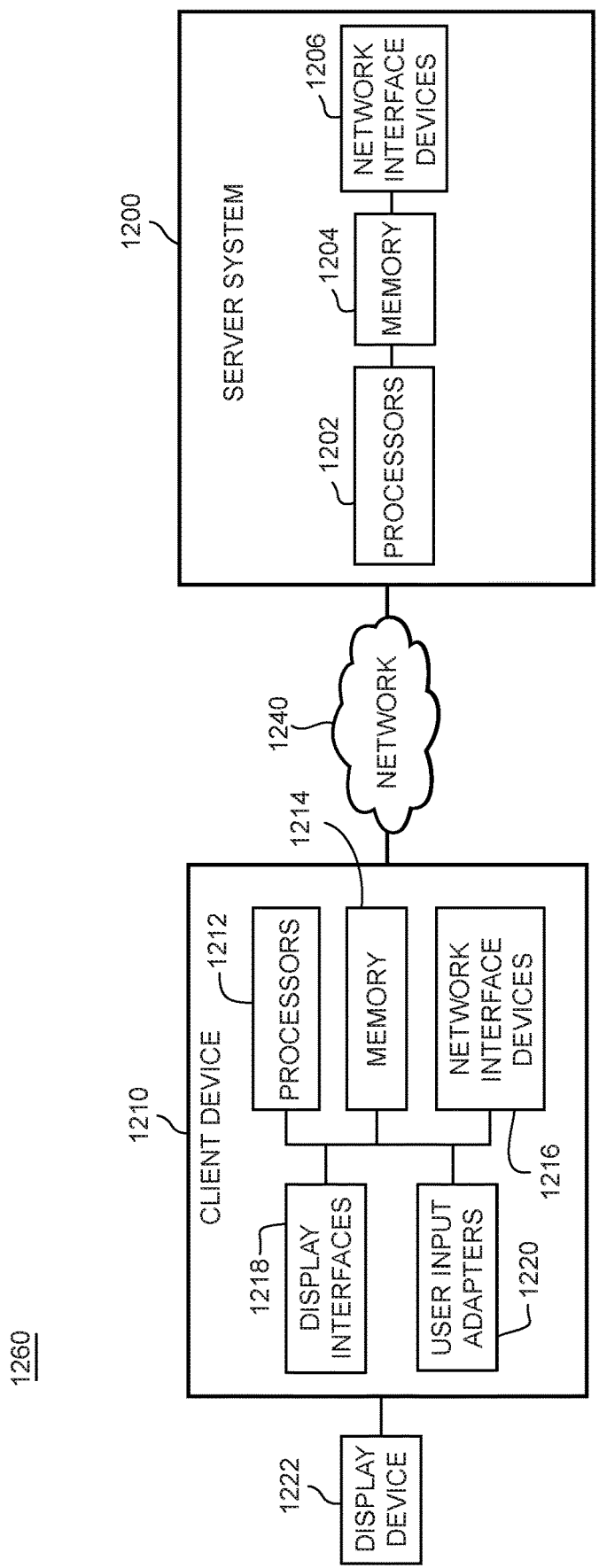
FIG. 7 shows a non-limiting example block diagram of hardware components comprising the system shown, at least, in FIG. 2.

FIG. 1 shows a non-limiting example system for processing order data. FIG. 2 shows a non-limiting example diagram of a system wherein the framework for processing order data and storing orders across multiple order books can be implemented. FIGS. 3A and 3B shown non-limiting example data structures for the order book(s) and order objects. FIG. 4 shows a non-limiting example table for determining whether an order can be eligible for storage in multiple order books. FIGS. 5A-E show non-limiting example methods and scenarios related to processing orders that are currently stored in multiple order books. FIG. 6 shows a non-limiting example flowchart for various processes carried out by the system. FIG. 7 shows an example system in which the features described herein may be implemented, wherein hardware aspects of the system are highlighted.

In many places in this document, software modules and actions performed by software modules are described. This is done for ease of description; it should be understood that, whenever it is described in this document that a software module performs any action, the action is in actuality performed by underlying hardware components (such as a processor and a memory) according to the instructions and data that comprise the software module.

Description of FIG. 1

FIG. 1 shows a non-limiting example system for processing order data. In particular, FIG. 1 illustrates an example embodiment of an automated exchange system 100 that can include one or more client terminals 110 that are used for issuing order data messages (e.g., input data that can be received by an exchange system 130). The client terminals 110 are connectable, for example, over a network 140 (e.g., the internet), or over some other connection means like a dedicated fiber, to an electronic marketplace being provided by means of the exchange system 130.

The automated exchange system 130 can be hosted on a computer server or a cluster of computer servers (e.g. including two or more computer servers). In certain instances, the client terminals 110 are connected to the exchange system 130 through a gateway 120. The gateway 120 may be connected to, or being a part of, the automated exchange system 130 and is typically configured to receive market actions (e.g. data messages including order objects originating from the terminals 110). The gateway 120 is usually in connection with the exchange system 130 on a dedicated network and forwards the market actions to the automated exchange system 130 (and can further broadcast updates back to the terminals 110).

It should however be understood that information being communicated to and from the exchange system 130 and the client terminals 110 could be communicated via a single communication path. While the terminals 110 in FIG. 1 are illustrated as trading terminals that traditionally are associated with manual input of market actions, the terminals 110 can additionally, or alternatively, be implemented as algorithmic trading units, sometimes termed automatic order generators, having manual input means for control of the algorithmic trading unit. The algorithmic trading unit is pre-programmed with instructions to automatically generate sell and buy orders and quotes (or changes/cancellations thereof) in response to input data received from the automated exchange system 130.

The automated exchange system 130 can also include data storage (e.g., memory). The data storage can include one or several order books. An order book typically comprises one or more lists of order instructions, wherein each order instruction is usually characterized by its order type (e.g. order size, order price, and/or order time). In each order book, the lists of order instructions are sorted. That is, order instructions have a priority in each order book. The priority may, for instance, be dependent of order reception time, order price, and/or order size.

It should be appreciated that the system(s) 110, 120, and 130 employ a variety of communication circuitry, as well as processing circuitry that includes input/output devices, data transceivers (for transmission of digital and/or analog signals), one or more processors (e.g., a CPU), one or more storage devices (e.g., a memory), and/or one or more audio/visual components (e.g., sound interface, display). Such components are highlighted and discussed with respect to FIG. 7.

Description of FIG. 2

FIG. 2 shows a non-limiting example diagram of a system wherein the framework for processing order data and storing orders across multiple order books can be implemented. As will be described below, one or more applications that implement the framework for processing order data and generating the user interface can be deployed in the system, and the various components in the system shown in FIG. 2 (such as the client system(s) 110, gateway system(s) 120, and/or server system(s) 130) can perform different functions related to the deployed applications.

As will be discussed below, FIG. 2 shows software modules executing at the client system(s) 110, server system(s) 130, and the gateway system(s) 120; it should be understood that the software modules shown in FIG. 2 are stored in and executed by hardware components (such as processors and memories); details regarding example hardware components that may be used to execute these software modules are provided below with reference to FIG. 7, as well as in other places in this document.

One or more client system(s) 110 can be configured to produce data file(s), via an order creator 111, containing data associated with orders generated by system(s) 100 (e.g., as an order data message). The order data message could include an order instruction that can be identified by one or more order specific parameters for the financial instrument to be traded. The order specific parameter for the financial instrument to be traded could include one or more of the following: order type, order price, order size, order time, and/or trading participant identity.

The data file could be an electronic data message and/or a data file formatted for processing by server system(s) 130. For example, the data file could be in the form of an XML file having different tags that are associated with data entries processed by system(s) 120/130. In another example embodiment, the data file could be a flat file having different entries separated by delimiters denoting different fields. In one example, the delimiters could be commas (e.g., a comma separated file). This example is non-limiting and the technology described herein envisions any type of delimiters for separating data elements in the data file. It should be appreciated that client system(s) 110 may be any client system interacting directly or indirectly with gateway system (s) 120 and/or server system(s) 130.

Gateway system(s) 120 are configured to serve as a gateway between the client system(s) 110 and the server system(s) 130. The gateway system(s) 120 can communicate with client system(s) 110 and server system(s) 130 over the network 140. In one non-limiting example, the gateway system(s) 120 can perform a variety of tasks after receiving the data files containing the order data message from client system(s) 110. Order processing module 121 is configured to, among other aspects, perform a variety of pre-processing on an order data message to ensure that the order is acceptable to submit to the server system(s) 130. Moreover, order processing module 121 can, in certain example embodiments, determine if an order data message satisfies certain criteria for allowing the order data contained in the order data message to exist in multiple different order books. The details of this determination and processing is discussed with respect to FIGS. 3-6 and throughout this document. It should be appreciated that the gateway system(s) 120 may be incorporated in a separate system from server system(s) 130 or could be integrated into server system(s) 130. Likewise, the system 100 may carry out all of the tasks performed at the gateway system(s) 120 within the server system(s) 130 itself.

Server system(s) 130 are configured to communicate with client system(s) 110 and gateway system(s) 120 (e.g., via network 140). It should be appreciated that the network 140 could comprise a network of interconnected computing devices, such as the Internet. The network 140 could also comprise a local area network (LAN) or could comprise a peer-to-peer connection between the different devices in the system. The server system(s) 130 could comprise any variety of server devices including, but not limited to, database servers, file servers, web servers, application servers, a server cluster (e.g., a cloud-based computing environment), a standalone server, and/or any other portable or stationary computing device having server-based capabilities. It should be appreciated that the server system(s) 220 can be implemented using separately located hardware (e.g., remote hardware) or can be implemented using a same piece of hardware (e.g., within a single housed server device).

Server system(s) 130 can receive the order data messages from client system(s) 110 via the gateway system(s) 120 via network 140. Upon receiving the order data message, the server system(s) 130 can, using order processing module 133, perform various processing on the order data contained in the order data message of the data files. For example, order processing module 133 may, in some embodiments, determine if the order data has been marked as being eligible for storage in multiple different orders books. Likewise, the order processing module 133 may process the order data against an order that is stored in multiple order books.

In more detail, the server system(s) 130 may include a matching engine 131 that attempts to match an order against one or more orders stored in order book(s) 132. For example, an order to purchase a certain amount of shares of a tradeable instrument at a particular price may be compared to orders stored in the order book(s) 132. If an order matches, then the order will "execute" and the order data associated with the order in the order book(s) 132 will be modified to reflect the change after execution. In a further non-limiting example, the server system(s) 130 may process the order against an order existing in multiple order book(s) 132 of system(s) 130. It should be appreciated that the order book(s) 132 may be formed as a data structure comprising a linked list architecture, the details of which are discussed below with respect to FIGS. 3-6 and throughout this document.

The server system(s) 130 may also include a set of reference data (or a database) 134 for storing data associated with orders and/or entities among a variety of other data. The reference data 134 may be or include one or more of: a relational database management system (RDBMS); an object-oriented database management system (OODBMS); an object-relational database management system (OR-DBMS); a not-only structured query language (NoSQL) data store; an object cache; a distributed file system; a data cluster (based on technology such as Hadoop); and/or any other appropriate type of data storage system).

It should be appreciated that the components shown in FIG. 2 can be implemented within a single system. The components could also be incorporated in multiple systems and/or a distributed computing environment (e.g., a cloud computing environment). Thus, the system is not limited to a single component and can be incorporated into multiple components.

Description of FIGS. 3A and 3B

FIGS. 3A and 3B shown non-limiting example data structures for the order book(s) and order objects. In the example of FIG. 3A, order book(s) 132 include one or more data structures representing order book related data. In one example, order book(s) 132 includes order book lists 132-A and order book object(s) 132-B.

As orders 111-1-111-n are received by the system 130, the system 130 can process the orders and place the various order data into one or more order book lists 132-A. In one non-limiting example, the order book lists 132-A comprise one or more linked lists where each node in the linked list relates to an order. Each node could include identifying information associated with the order as well as other related information (e.g., price and quantity available). The linked list may be a singly linked list having a linear data structure that links in a single direction, or a doubly linked list that has references in two directions to a previous node as well as a next node. As discussed with respect to FIG. 3B, the order book lists 132-A are, in a non-limiting example embodiment, doubly linked lists that prioritize the orders in the list (i.e., the position of the orders in the list corresponds to the order priority).

It should be appreciated that the order book(s) 132 may reside in one or more memories of the system 130 (as detailed below with respect to FIG. 7). The memories may be configured to store validated, but unmatched (i.e. standing), order instructions in one or several order books 132. Thus, the memories may include multiple order books where each order book of the multiple order books may include lists of order instructions.

In an example embodiment, each order book comprises one or more separate lists, or structures, of references to specific order objects. An order object comprises the characteristics of the received order instruction (e.g., e.g. size/price/time) and the order object may be created by a real or virtual representation in the memory. It should be appreciated that the order book lists 132-A may include order books associated with a lit order book, an auction order book, and/or a dark order book where one or more orders may reside in one or more of the order books.

The order book(s) 132 may also include order book object(s) 132-B. In one non-limiting example embodiment, when an order exists in multiple order book lists 132-A (but not necessarily residing in the same memory—i.e., the same object), the system 130 may generate a "virtual" order book object associated with the order. As will be discussed in more detail with respect to FIG. 3B, the order book object may include a data structure having multiple memory address pointers referencing the position of each order in the respective order book. The "virtual" order book object will be stored as the order book object(s) 132-B and thus the system may use order book object(s) 132-B to reference the order and make any necessary modifications to the order contained in order book lists 132-A.

In one non-limiting example, the system 100 may apply certain rules to the order to determine whether the order can exist in multiple order books. For example, the system 100 may be configured to determine whether the order instruction included in the received message meets certain criteria allowing the order instruction to be placed in multiple order books simultaneously by enabling reference to a common specific order object. The criteria may, in certain embodiments, be related to order type, order size, order price, order time and/or trading participant identity. If the order is eligible to be placed in multiple order books (i.e., multiple order book lists 132-A), then an order book object 132-B is generated to reference the order in each order book. In this configuration, whenever an incoming order instruction matches against another existing order in one order book, the order object is immediately updated. As a result, all order instructions in all the parallel order books will point at the same updated order object. Such a configuration can advantageously preclude any over-fill and also preclude the display of overrepresented liquidity in the aggregated order books.

FIG. 3B shows a non-limiting example data structure for the order book lists as well as the order book objects. In one non-limiting example, the system 100 may have multiple order book lists 132-A1-132-A3 corresponding to multiple different order books (e.g., a lit order book, an auction order book, a dark order book). Each order book list 132-A1-132-A3 (hereinafter referred to as "order book lists 132-A") may be represented, in a non-limiting example embodiment, as a doubly linked list.

The linked list of order book lists 132-A can contain data for one or more orders where each node can include the details of the particular order (e.g., order ID, quantity, size, price). Each node can also include pointers that reference a next and/or previous node. In particular, the pointer N indicates a reference to a next node and "points" to a memory address location associated with the next node. Likewise, the pointer P indicates a reference to a previous node and "points" to a memory address location associated with the previous node. It should be appreciated that in certain example embodiments, Buy and Sell orders may normally reside in separate lists part of the order book(s).

It should be appreciated that the head node (e.g., "ORDER 1") corresponds to the head of the list and thus a pointer P is not referencing a previous node, while the last node in the list (e.g., "ORDER z") constitutes the tail and pointer N does not reference a next node (but instead points to a NULL value). It should be appreciated that this example linked list is non-limiting and the technology envisions any variety of linked list including a singly linked list, a circular linked list, and/or multiple linked list.

In cases where nodes represent multi order book orders, the nodes in the linked list of order book lists 132-A (i.e., the order) may also include a pointer showing that the node contains an order that is existing in multiple order books. That is, the node may contain a multiple order pointer indicating that the order has satisfied criteria allowing the order to be placed in multiple order book lists 132-A. In such a case, the Virtual Order Book Pointer Object references the "virtual" order book object in 132B that references the order in each order book. As a non-limiting example, the order book objects 132-B may be data structures that includes elements associated with the order stored in the multiple order books (e.g., an order ID). The data structure may also include several pointers P1-P3 that reference the location of each previous order object in the respective list the order resides. That is, in the example shown in FIG. 3B, ORDER 2 resides in at least three order book lists (i.e., lists 132-A1, 132-A2, and 132-A3) where pointers P1-P3 reference the memory location of the previous order in each respective order book.

Likewise, the data structure may also include several pointers N1-N3 that reference the location of each next order object in the respective list the order resides. For example, ORDER 2 resides in at least three order books where pointers N1-N3 reference the memory location of the next order in each respective order book. It should be appreciated that this example is non-limiting and the data structure of the order book objects 132-B may contain any number of pointers for referencing the previous and/or next nodes in the respective lists.

In one non-limiting example, the order book lists 132-A will be sorted in order of priority for each order. Thus, when an order is received at the exchange that requires certain orders in the lists 132-A to be modified, the lists 132-A may be re-ordered as the priority of the orders may change. In doing so, the order book objects 132-B may be advantageously used to update orders across all order books by finding the respective order in each list (i.e., using the pointers P1-P3 and/or N1-N3) and then updating the order book objects 132-B to reflect any change in the respective lists by updating the various pointers in the data structure.

Description of FIG. 4

FIG. 4 shows a non-limiting example table for determining whether an order can be eligible for storage in multiple order books. In one non-limiting example, the table 400 shown in FIG. 4 may be stored in the database 134 of the system 130. It should be appreciated that the table could also include additional and/or different elements than the ones presented in FIG. 4.

As discussed above, the system 100 determines if certain orders are eligible to be placed into multiple order books. As also explained above, an order-book is a list of orders objects that can be identified by, at least, type and stock. The list can be ordered (i.e., order objects have a priority in the order book). For example it may be ordered/prioritized by time (e.g., a lit book) or ordered by size (e.g., a dark order book). Matching of complementary order actions (buy-sell) is done in the order priority of the order book. Matching and other modifications of the order properties or instruction to perform an action modifies not only the order object but potentially also the priority in the book. Furthermore adding/removing other orders in an order book may impact the priority of the reaming orders.

In conventional systems, an order object can only exist in one order book at a time. This is due, in part, to the nature of an order which is to buy and/or sell a tradeable instrument at a particular price/amount. Exposing an order in multiple order books would thus multiple the exposure of the order (e.g., thereby increasing various risk associated with matching the order).

Matching, modifying, adding, or removing (sometimes referred to as an event) orders is done atomically by the order book. Thus, an event may only impact one order book at a time. In one non-limiting example, as long as order book events are executed atomically in a consecutive order, an order object may exist in more than one order book simultaneously (e.g., since any modification of the order will immediately be in effected with regards to properties in any other order book of which it is a part). If a property that determines the priority in the order book is modified, the order priority must be updated in the book, before any other order book event takes place of which the order is part. Events may still be performed simultaneously on multiple order books as long as the order books which have "multi orders" are processed consecutively. An order object may not necessarily be a single instance in memory—as long as all multiples (e.g., identical copies) are updated with any change before any other event on the order.

The technology described herein envisions running at least three parallel order books for the same stock and offering three different trading mechanisms and liquidity pools. Trading can be conducted within the same single threaded matching engine where lit book orders are matched in continuous lit matching. For orders in the auction order book, orders are matched in short periodic auctions whenever there is a matching opportunity and in the dark order book, orders are matched continuously utilizing a reference. Matching in these order books can be conducted independently where orders sent to the lit book are matched with other orders within that book. The technology described herein envisions allowing orders fulfilling certain type, size, and/or price requirements to be exposed in all three books at the same time without risk to be overfilled.

In certain non-limiting example embodiments, an order that exists in multiple order books must have a certain definition and satisfy certain requirements. In one non-limiting example, an order that can exist in multiple order books may be referred to as a multi order book block order ("MOBO") and will have the following attributes:

Separate order type

A midpoint pegged order

The order is hidden, and not published in a lit book

Represents one order object

May have a Limit guard protection price (i.e., a price where the midpoint peg price becomes worse as the order is suspended from trading)

May have protection against smaller fills

One main feature of a MOBO is that it must be hidden from the market participants and, for certain order books, this would be satisfied by a "Large In Scale" ("LIS") requirement and considered as a multi order book block order at order entry. FIG. 4 shows a non-limiting example LIS table 400 for satisfying the LIS requirements.

In more detail, a MOBO order may need to be LIS (e.g., for orders in the lit book) at order entry where the LIS is defined based on certain requirements. In one non-limiting example, the LIS table 400 can include a row for the average daily turnover ("ADT") requirement 401 and a minimum order size requirement 402. It should be appreciated that the example shown in FIG. 4 refers to the ADT and minimum size of an order with respect to the euro currency (EUR).

In one non-limiting example embodiment, the ADT requirement 401 may refer to the average daily "turnover" for a tradeable instrument in a given day. The ADT requirement 401 may also be provided over various ranges in which the minimum order size requirement 402 may change depending on the range. As can be seen in FIG. 4, for example, the ADT requirement 401 for company A's tradeable instrument may be, at a minimum, a range from 0-50,000 EUR where the minimum order size requirement 402 for that range (i.e., less than 50,000 EUR) would be 15,000 EUR. In one non-limiting example, the ADT and minimum order size requirement can be the overall volume of orders for the tradeable instrument (i.e., price*quantity). Thus, when the ADT requirement 401 for company A's tradeable instrument is less than 50,000 EUR, the minimum order size for the tradeable instrument must be at least 15,000 EUR in order to satisfy the LIS requirements.

As can be seen in FIG. 4, as the range increases (e.g., from left-to-right) for the ADT requirement 401, the minimum order size requirement 402 can also increase. It should be appreciated that the increase may not necessarily be proportional based on a particular percentage, but may decrease in percentage as the ADT requirement 401 increases. In one non-limiting example, if an order does not satisfy the LIS requirements as set out in FIG. 4, the order will not be eligible as a MOBO and will be placed in only a single order book.

It should also be appreciated that the LIS table 400 may vary based on both the entity (e.g., company) and instrument being traded and may be variable depending upon any variety of factors. Moreover, the LIS table 400 may be calculated at the beginning/end of a day as a batch job so that the LIS table 400 will remain constant during a given trading day. This example is of course non-limiting and the technology envisions any variety of methods for generating the LIS table 400 including real-time generation. In another non-limiting example, the time in force allowed for such orders may be either DAY and/or GTT and it may be possible to send a MOBO via the FIX and/or OUCH order entry protocols.

Description of FIGS. 5A-E

FIGS. 5A-E show non-limiting example methods and scenarios related to processing orders that are currently stored in multiple order books. FIGS. 5A-E specifically shows a process that can be carried out, for example, by server 130 for processing the order data received from client 110.

FIGS. 5A-D show example scenarios 500 where an order may be received by server 130 for a particular tradeable instrument where the order may then process across multiple order books. As mentioned above, there are certain requirements for determining whether an order can be initially placed into multiple order books. After the order is placed in multiple order books (and a virtual order object is generated to reference the order in each book), the system 100 can process orders against the order in multi order books. The examples shown in FIGS. 5A-D depict scenarios where an order in multiple order books is processed against one or more "inbound" orders received by the system 100.

It should be appreciated that the examples shown in FIGS. 5A-D depict a MOBO representing one order object and the order object is presented in three order books (e.g., a lit order book, a dark order book, and an auction order book). The order in this case will have the same price and quantity and the price of the order may be determined based on a midpoint of a current spread. In the example of FIGS. 5A-D the current spread is 99-101 so the mid value is 100. Another assumption that is presented in these figures is that 1000 shares represent a value exceeding the LIS (as discussed above) and hence the order will be accepted against all of the order books (for sake of example, the current LIS value is 500 shares for the examples of FIGS. 5A-D).

FIG. 5A thus shows an initial example where an order having order ID 501 exists in three order books 502-504. The example also highlights that the order may contain a volume 505 and price 506 for each order. For example, an order in each book may be available for 1000 shares and 100 dollars per share.

In this example, the order exists in a lit order book 502, a dark order book 503, and an auction order book 504. It should be appreciated that orders present in the lit order book 502 may be published (e.g., open to the public). But, when the order exists in multiple different order books, it is possible to make the order unpublishable while it resides in the other order books. It should also be appreciated that each order book may be used for different purposes and each order book may have different operability with respect to each order. For example, the lit order book 502 may contain orders that are typically in the public market while the dark order book 503 may contain non-public orders that may include many large orders. Likewise the auction order book 504 may impose certain limitations on what can be done with particular orders.

FIG. 5B thus shows a non-limiting example when midpoint change occurs for an order existing in multiple orders books. As can be appreciated, certain market conditions and/or other situations may cause the spread price of a tradeable instrument to change. When this occurs, the midpoint for the instrument may also change and thus affect the orders residing in all three order books. In order to ensure integrity in the system 100, the orders must be synchronized in all three order books. Thus, FIG. 5B shows an example where the order midpoint price will be updated in the three books to reflect this change. In the example of FIG. 5B, the order midpoint may change from 100 to 101 and thus the same order object is re-priced simultaneously in all books.

In one non-limiting example, the order midpoint may first change in a single order book (e.g., the lit book 502). When this happens, the system 100 can update the midpoint price in the lit book 502 and then reference the virtual order object in the order object data structure (shown, for example, in FIG. 3A as order object 132). The system 100 may use the virtual order object to determine the location of the order in the other order books 503/504 by using the respective pointers for the order in the linked list of each book. After the changes then occur, the system 100 can re-order the orders in each book and update the pointers in the order object data structure. The system thus advantageously provides a method for maintaining integrity of the order across all order books in a fast an efficient manner. In particular, this method allows the orders to remain in each order book without the system having to systematically "freeze" individual orders when changes occur thus improving the latency of the system.

FIG. 5C thus shows a non-limiting example scenario where an order matches in at least one order book. In the example shown in FIG. 5C, an incoming "aggressive" order executes (i.e., matches) for 300 shares in the lit book 502. In this example, the same order remaining quantity is updated to 700 shares in all order books 502-504 sequentially in order to reflect the change. In this case, no other order may execute in any other book until the update becomes active. In one non-limiting example, this same process would occur if the order executed against the dark order book 503.

It should be appreciated that when the order is executed against the lit order book 502, the system 100 may first update the order in the lit order book 502. The system 100 may then use the virtual order object data structure to determine the order location in the order in the other order books 503/504 and then sequentially update the orders in each book. Any changes that occur to the order priority may then be updated in each book and the pointers referencing the previous/next locations of the objects in each book may then be updated.

FIG. 5D thus shows yet another example scenario where an inbound order received by system 100 may match against an order book that processes under different requirements and/or restrictions. In the example of FIG. 5D, the inbound order processes against the auction order book 504 where the order may be handled differently by system 100 as compared to orders processed against lit order book 502 or dark order book 503.

In the example of FIG. 5D, the order may be an incoming "aggressive" order that enters the auction order book 504 for 200 shares. As can be appreciated, the auction order book 504 pertains to actual auctions for different orders and thus the process for executing the order may not be as straightforward compared to other order books. In this example, the auction order book 504 will have a process initiated in association with matching the order where an auction is carried out and all orders in the book will be subject for a cancel "speed bump" thus putting any cancels in a pending state. When this occurs, the order in the lit order book 502 and the dark order book 503 are suspended until the order/auction complete in the order book 504. The system 100 carries out this process in order to prevent any risk of being overfilled. Thus, FIG. 5D shows an example where the order in lit book 502 and dark order book 503 are "suspended" while the order in the auction order book 504 will be flagged as participating in an auction.

FIG. 5E shows a non-limiting example condition table 550 for determining how to process orders under different conditions. In the example shown in FIG. 5E, the system 100 can establish a list of conditions when the execution of an inbound order will cause the order (possibly in all three order books 502-504) to fall below the LIS requirement. It should be appreciated that the rules that apply against the dark order book 503 depend if the Double Volume Caps (DVC) is in effect or not. It should be appreciated that, in certain markets, there are "caps" in place for "dark" trading. For example, the European Union may impose such caps and thus, if a European trader is "capped" by legislative requirements then they may be unable to trade in a "dark" order book. In one non-limiting example, the DVC will stop continuous dark matching in the dark order book 503 for orders not fulfilling LIS and thus special logic may apply.

In the example shown in FIG. 5E, the condition table 550 provides for one or more conditions 551-553 depending on whether the order executes against an order in a particular order book 502-504. Condition 551, for example, relates to a situation where an order is executed against an order in lit book 502 and the "stub" falls below the LIS requirement. It should be appreciated that the "stub" may refer to the remainder of a particular order (e.g., the amount of the order that remains after the current order executes). In condition 551, if the order stub falls below LIS and the order executes against the lit order book 502, the stub falling below the LIS may stay in the lit order book 502 and may also stay in the auction order book 504. However, the stub for the order may or may not stay in the dark order book 503 depending on whether DVC applies. In particular, if DVC does not apply, the stub may stay in dark order book 503. Likewise, if DVC does apply, the stub will be removed from the dark order book 503.

Condition 552, for example, can relate to a situation where an order executes against an order in the dark order book 503 and the stub falls below LIS. In this non-limiting example, if the order stub falls below the LIS requirement and the order executes against an order in the dark order book 503, the stub falling below the LIS requirement in the lit order book 502 will be removed from the book and will no longer be hidden (e.g., to the public). On the contrary, any order stub residing in the auction order book 504 will stay in the auction order book 504. Moreover, the stub falling below the LIS requirement may stay in the dark order book 503.

Condition 553, for example, can relate to a situation where an order executes against an order in the auction order book 504 and the stub falls below the LIS requirement. In this non-limiting example, if the order stub falls below the LIS requirement and the order executes against an order in the auction order book 504, the stub falling below the LIS requirement in the lit order book 502 will be removed from the book and, similar to condition 552, will no longer continue to be hidden (e.g., to the public). Also similar to conditions 551 and 552, the stub for the order will remain in the auction order book 504. The stub for the order will remain in the dark order book 503 depending on whether the DVC applies. In particular, if the DVC does not apply, the stub for the order in the dark order book 503 will remain in the book. Likewise, if the DVC does apply, the stub for the order in the dark order book 503 will be removed. It should be appreciated that these examples are non-limiting and the technology envisions any variety of conditions and/or rules that can be applied in situations where orders are processed against other orders residing in multiple order books (and/or whether the order will fall below LIS requirements after execution).

Description of FIG. 6

FIG. 6 shows a non-limiting example flowchart for various processes carried out by system 100. FIG. 6 specifically shows a process that can be carried out, for example, by gateway 120 and/or server 130 for processing the order data received from client 110. Of course, the process shown in FIG. 6 is not limited to such a configuration and can be carried out by any number of devices/systems and/or configurations.

The example shown in FIG. 6 depicts a situation where an order is received by the gateway 120 and/or server 130 and the system 100 determines if the order is eligible to be placed into multiple order books. The process begins when an order is received (601) by the gateway 120 and/or server 130. In one non-limiting example, orders may be received from the one or more client systems 110 and can be received first by the gateway 120 or received directly by server 130. Upon receiving the order the gateway 120 and/or server 130 may perform various processing on the order data message (602). In one non-limiting example, the order processing module 121 and/or order processing module 133 (as shown, for example, in FIG. 2) may carry out the different order processing tasks. For example, the order processing module 121 may perform processing on the order to determine if the order is eligible to be placed into multiple order book memories of server 130.

After performing certain processing on the order, the gateway 120 and/or server 130 determine if the order satisfies certain criteria (603). In one non-limiting example, the gateway 120 and/or server 130 will determine if the order meets the definition for a MOBO and/or if the order satisfies the LIS requirements (as discussed with respect to FIGS. 4-5E). If the order does not satisfy the necessary criteria, the data from the order is placed into the respective order book (604). For example, if an order is submitted through the system 100 for processing in the lit order book 502, and the order does not satisfy the necessary criteria for placement into multiple order books, the gateway 120 may flag the order as being ineligible for placement into multiple order books and the server 130 may then put the order into the lit order book for matching.

If the system 100 determines that the order does satisfy the necessary criteria, the gateway 120 may then flag the order as being eligible for placement in multiple order books and then generate a virtual order object (605) for the order where the virtual order object may have multiple pointers to reference the location of the order in each order book it resides. The server 130 then may place the data for the order in a first order book (606) which, in this example, may be the lit order book 502.

The server 130 may then place the data from the order into the other order books (e.g., the dark order book 503 and/or auction order book 504) (S607). Upon placement into the other order books, the server 130 may also update the virtual order object associated with the order in each book by updating the pointer information for the locations of the orders in the respective books.

It should be understood that, although action 601 through action 607 are described above as separate actions with a given order, this is done for ease of description. It should be understood that, in various embodiments, the above-mentioned actions may be performed in various orders; alternatively or additionally, portions of the above-described actions (action 601 through action 607) may be interleaved and/or performed concurrently with portions of the other actions (action 601 through action 607).

Description of FIG. 7

FIG. 7 shows a non-limiting example block diagram of a hardware architecture for the system 1260. In the example shown in FIG. 7, the client device 1210 communicates with a server system 1200 via a network 1240. The network 1240 could comprise a network of interconnected computing devices, such as the internet. The network 1240 could also comprise a local area network (LAN) or could comprise a peer-to-peer connection between the client device 1210 and the server system 1200. As will be described below, the hardware elements shown in FIG. 7 could be used to implement the various software components and actions shown and described above as being included in and/or executed at the client device 1210 and server system 1200.

In some embodiments, the client device 1210 (which may also be referred to as "client system" herein) includes one or more of the following: one or more processors 1212; one or more memory devices 1214; one or more network interface devices 1216; one or more display interfaces 1218; and one or more user input adapters 1220. Additionally, in some embodiments, the client device 1210 is connected to or includes a display device 1222. As will explained below, these elements (e.g., the processors 1212, memory devices 1214, network interface devices 1216, display interfaces 1218, user input adapters 1220, display device 1222) are hardware devices (for example, electronic circuits or combinations of circuits) that are configured to perform various different functions for the computing device 1210.

In some embodiments, each or any of the processors 1212 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1212 uses an instruction set architecture such as x86 or Advanced RISC Machine (ARM).

In some embodiments, each or any of the memory devices 1214 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1212). Memory devices 1214 are examples of non-volatile computer-readable storage media.

In some embodiments, each or any of the network interface devices 1216 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 1218 is or includes one or more circuits that receive data from the processors 1212, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1222, which displays the image data. Alternatively or additionally, in some embodiments, each or any of the display interfaces 1218 is or includes, for example, a video card, video adapter, or graphics processing unit (GPU).

In some embodiments, each or any of the user input adapters 1220 is or includes one or more circuits that receive and process user input data from one or more user input devices (not shown in FIG. 7) that are included in, attached to, or otherwise in communication with the client device 1210, and that output data based on the received input data to the processors 1212. Alternatively or additionally, in some embodiments each or any of the user input adapters 1220 is or includes, for example, a PS/2 interface, a USB interface, a touchscreen controller, or the like; and/or the user input adapters 1220 facilitates input from user input devices (not shown in FIG. 7) such as, for example, a keyboard, mouse, trackpad, touchscreen, etc. . . . .

In some embodiments, the display device 1222 may be a Liquid Crystal Display (LCD) display, Light Emitting Diode (LED) display, or other type of display device. In embodiments where the display device 1222 is a component of the client device 1210 (e.g., the computing device and the display device are included in a unified housing), the display device 1222 may be a touchscreen display or non-touchscreen display. In embodiments where the display device 1222 is connected to the client device 1210 (e.g., is external to the client device 1210 and communicates with the client device 1210 via a wire and/or via wireless communication technology), the display device 1222 is, for example, an external monitor, projector, television, display screen, etc. . . . .

In various embodiments, the client device 1210 includes one, or two, or three, four, or more of each or any of the above-mentioned elements (e.g., the processors 1212, memory devices 1214, network interface devices 1216, display interfaces 1218, and user input adapters 1220). Alternatively or additionally, in some embodiments, the client device 1210 includes one or more of: a processing system that includes the processors 1212; a memory or storage system that includes the memory devices 1214; and a network interface system that includes the network interface devices 1216.

The client device 1210 may be arranged, in various embodiments, in many different ways. As just one example, the client device 1210 may be arranged such that the processors 1212 include: a multi (or single)-core processor; a first network interface device (which implements, for example, WiFi, Bluetooth, NFC, etc . . . ); a second network interface device that implements one or more cellular communication technologies (e.g., 3G, 4G LTE, CDMA, etc . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the client device 1210 may be arranged such that: the processors 1212 include two, three, four, five, or more multi-core processors; the network interface devices 1216 include a first network interface device that implements Ethernet and a second network interface device that implements WiFi and/or Bluetooth; and the memory devices 1214 include a RAM and a flash memory or hard disk.

Server system 1200 also comprises various hardware components used to implement the software elements for server system 220 of FIG. 2 an. In some embodiments, the server system 1200 (which may also be referred to as "server device" herein) includes one or more of the following: one or more processors 1202; one or more memory devices 1204; and one or more network interface devices 1206. As will explained below, these elements (e.g., the processors 1202, memory devices 1204, network interface devices 1206) are hardware devices (for example, electronic circuits or combinations of circuits) that are configured to perform various different functions for the server system 1200.

In some embodiments, each or any of the processors 1202 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1202 uses an instruction set architecture such as x86 or Advanced RISC Machine (ARM).

In some embodiments, each or any of the memory devices 1204 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1202). Memory devices 1204 are examples of non-volatile computer-readable storage media.

In some embodiments, each or any of the network interface devices 1206 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In various embodiments, the server system 1200 includes one, or two, or three, four, or more of each or any of the above-mentioned elements (e.g., the processors 1202, memory devices 1204, network interface devices 1206). Alternatively or additionally, in some embodiments, the server system 1200 includes one or more of: a processing system that includes the processors 1202; a memory or storage system that includes the memory devices 1204; and a network interface system that includes the network interface devices 1206.

The server system 1200 may be arranged, in various embodiments, in many different ways. As just one example, the server system 1200 may be arranged such that the processors 1202 include: a multi (or single)-core processor; a first network interface device (which implements, for example, WiFi, Bluetooth, NFC, etc . . . ); a second network interface device that implements one or more cellular communication technologies (e.g., 3G, 4G LTE, CDMA, etc . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the server system 1200 may be arranged such that: the processors 1202 include two, three, four, five, or more multi-core processors; the network interface devices 1206 include a first network interface device that implements Ethernet and a second network interface device that implements WiFi and/or Bluetooth; and the memory devices 1204 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the client device 210 or the server system 220, each of which will be referred to individually for clarity as a "component" for the remainder of this paragraph, are implemented using an example of the client device 1210 or the server system 1200 of FIG. 7. In such embodiments, the following applies for each component: (a) the elements of the client device 1210 shown in FIG. 7 (i.e., the one or more processors 1212, one or more memory devices 1214, one or more network interface devices 1216, one or more display interfaces 1218, and one or more user input adapters 1220) and the elements of the server system 1200 (i.e., the one or more processors 1202, one or more memory devices 1204, one or more network interface devices 1206), or appropriate combinations or subsets of the foregoing, are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the respective memory devices (e.g., in various embodiments, in a volatile memory device such as a RAM or an instruction register and/or in a non-volatile memory device such as a flash memory or hard disk) and all actions described herein as performed by the software modules are performed by the respective processors in conjunction with, as appropriate, the other elements in and/or connected to the client device 1210 or server system 1200; (c) alternatively or additionally, to the extent it is described herein that the component processes and/or otherwise handles data, in some embodiments, such data is stored in the respective memory devices (e.g., in some embodiments, in a volatile memory device such as a RAM and/or in a non-volatile memory device such as a flash memory or hard disk) and/or is processed/handled by the respective processors in conjunction, as appropriate, the other elements in and/or connected to the client device 1210 or server system 1200; (d) alternatively or additionally, in some embodiments, the respective memory devices store instructions that, when executed by the respective processors, cause the processors to perform, in conjunction with, as appropriate, the other elements in and/or connected to the client device 1210 or server system 1200, each or any combination of actions described herein as performed by the component and/or by any software modules described herein as included within the component.

The hardware configurations shown in FIG. 7 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 7, (e) via other hardware arrangements, architectures, and configurations, and/or via combinations of the technology described in (a) through (e).

Technical Advantages of Described Subject Matter

The technology described herein allows for efficient storage and processing of order data and improves the system's ability to manage data across multiple different order book memories. In particular, the technology enables the system to place an order into multiple different order book memories and then later process orders against the order in the multiple order book memories in a manner that maintains data integrity across the system. More specifically, the technology allows the system to manage large amounts of data across multiple different order book memories in a manner that maintains integrity of the data and enables the system to continue to process data without reducing the latency/throughput of the system.

The technology described herein thus also allows the system to process order data against multiple different order books in a manner that does not impede the overall processing of the system. In particular, by managing the order data across the multiple different order book memories in the manner described herein, the system can process large volumes of order data messages while simultaneously maintain the data integrity in each order book thus improving the system's ability to both manage data and maintain efficient order processing latency.

Selected Definitions

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Further Applications of Described Subject Matter

Although process steps, algorithms or the like, including without limitation with reference to FIGS. 1-7, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A system configured to process orders among multiple order book memories, comprising:
 a gateway system having processing circuitry including at least one processor, the gateway system configured to:
  receive an order data message from at least one client device, the order data message containing data for an order of at least one tradeable instrument;
  determine if the order in the order data message satisfies one or more criteria; and
  mark the order as eligible for a multi-book order if the order satisfies the one or more criteria, and
 a server system having processing circuitry including at least one processor, the server system communicating with the gateway system and configured to:
  receive the order data message from the gateway system; and
  process the order data message based on whether the order is marked as the multi-book order, wherein processing the order data message in association with the order being marked as a multi-book order further includes:
   generate an order object as a representation of the order and store the order object in a memory of the server system, the order object including a data structure having at least a first pointer and a second pointer;
   store the data from the order data message in a first order book memory of the server system, the first order book memory including a first linked list having a plurality of first nodes wherein each node in the plurality of first nodes is associated with each order in the first order book memory, and the data from the order data message stored in the first order book memory being referenced using the first pointer of the data structure of the order object;
   store the data from the order data message in at least a second order book memory of the server system, the second order book memory including a second linked list having a plurality of second nodes wherein each node in the plurality of second nodes is associated with each order in the second order book memory, and the data from the order data message stored in the second order book memory being referenced using the second pointer of the data structure of the order object;
   update the first pointer of the data structure based on the order data message stored in the first order book memory;
   update the second pointer of the data structure based on the order data message stored in the second order book memory;
   modify positions of the plurality of first nodes in the first linked list based on the updated first pointer of the data structure; and
   modify position of the plurality of second nodes in the second linked list based on the updated second pointer of the data structure.

2. The system of claim 1, wherein the one or more criteria relate to whether the order can be a hidden order.

3. The system of claim 2, wherein the order is a hidden order when a price and quantity of the order exceed an average daily turnover.

4. The system of claim 1, wherein when the order is updated in the first order book memory, the order is then updated in the second order book memory.

5. The system of claim 1, wherein the server system includes at least a third order book memory, and the first, second, and third order book memory correspond to a lit central limit order book, an auction on demand order book, and a dark order book.

6. The system of claim 5, wherein when the order no longer satisfies the one or more criteria, the server system will process the orders in each of the lit central limit order book, the auction on demand order book, and the dark order book differently depending on which order book the order executes.

7. A method for processing orders among multiple order book memories, comprising:
 at an information processing system having at least one processor:
  receiving an order data message from at least one client device, the order data message containing data for an order of at least one tradeable instrument;

determining if the order in the order data message satisfies one or more criteria;
marking the order as eligible for a multi-book order if the order satisfies the one or more criteria;
processing the order data message based on whether the order is marked as the multi-book order, wherein processing the order data message in association with the order being marked as a multi-book order further includes:
  generating an order object as a representation of the order and storing the order object in a memory of the information processing system, the order object including a data structure having at least a first pointer and a second pointer;
  storing the data from the order data message in a first order book memory of the information processing system, the first order book memory including a first linked list having a plurality of first nodes wherein each node in the plurality of first nodes is associated with each order in the first order book memory, and the data from the order data message stored in the first order book memory being referenced using the first pointer of the data structure of the order object;
  storing the data from the order data message in at least a second order book memory of the information processing system, the second order book memory including a second linked list having a plurality of second nodes wherein each node in the plurality of second nodes is associated with each order in the second order book memory, and the data from the order data message stored in the second order book memory being referenced using the second pointer of the data structure of the order object;
  updating the first pointer of the data structure based on the order data message stored in the first order book memory;
  updating the second pointer of the data structure based on the order data message stored in the second order book memory;
  modifying positions of the plurality of first nodes in the first linked list based on the updated first pointer of the data structure; and
  modifying position of the plurality of second nodes in the second linked list based on the updated second pointer of the data structure.

8. The method of claim 7, wherein the one or more criteria relate to whether the order can be a hidden order and the order is a hidden order when a price and quantity of the order exceed an average daily turnover.

9. The method of claim 7, wherein the information processing system includes at least a third order book memory, and the first, second, and third order book memory correspond to a lit central limit order book, an auction on demand order book, and a dark order book.

10. The method of claim 9, wherein when the order no longer satisfies the one or more criteria, the server system will process the orders in each of the lit central limit order book, the auction on demand order book, and the dark order book differently depending on which order book the order executes.

11. A server system, comprising:
a processor;
a communications device; and
a memory storing one or more order books and further storing computer readable code that, when executed by the processor, cause the server system to:
  receive an order data message from at least one client device, the order data message containing data for an order of at least one tradeable instrument;
  determine if the order in the order data message satisfies one or more criteria;
  mark the order as eligible for a multi-book order if the order satisfies the one or more criteria;
  process the order data message based on whether the order is marked as the multi-book order, wherein processing the order data message in association with the order being marked as a multi-book order further includes:
    generate an order object as a representation of the order and store the order object in the memory of the server system, the order object including a data structure having at least a first pointer and a second pointer;
    store the data from the order data message in a first order book memory of the server system, the first order book memory including a first linked list having a plurality of first nodes wherein each node in the plurality of first nodes is associated with each order in the first order book memory, and the data from the order data message stored in the first order book memory being referenced using the first pointer of the data structure of the order object;
    store the data from the order data message in at least a second order book memory of the server system, the second order book memory including a second linked list having a plurality of second nodes wherein each node in the plurality of second nodes is associated with each order in the second order book memory, and the data from the order data message stored in the second order book memory being referenced using the second pointer of the data structure of the order object;
    update the first pointer of the data structure based on the order data message stored in the first order book memory;
    update the second pointer of the data structure based on the order data message stored in the second order book memory;
    modify positions of the plurality of first nodes in the first linked list based on the updated first pointer of the data structure; and
    modify position of the plurality of second nodes in the second linked list based on the updated second pointer of the data structure.

12. The server system of claim 11, wherein the server system includes at least a third order book memory, and the first, second, and third order book memory correspond to a lit central limit order book, an auction on demand order book, and a dark order book.

13. The server system of claim 12, wherein when the order no longer satisfies the one or more criteria, the server system will process the orders in each of the lit central limit order book, the auction on demand order book, and the dark order book differently depending on which order book the order executes.

14. The system of claim 1, wherein the server system is further configured to:
update the data from the order data message stored in the first order book memory;
update the first pointer and the second pointer of the data structure based on the updated data from the order data message;

modify the positions of the plurality of first nodes in the first linked list based on the updated first pointer of the data structure; and modify the positions of the plurality of second nodes in the second linked list based on the updated second pointer of the data structure.

15. The system of claim 14, wherein modifying the positions of the plurality of first nodes in the first linked list includes reprioritizing the plurality of first nodes based on the updated first pointer; and modifying the positions of the plurality of second nodes in the second linked list includes reprioritizing the plurality of second nodes based on the updated second pointer.

16. The system of claim 1, wherein the first linked list and the second linked list are singly link lists linking in a single direction.

17. The system of claim 1, wherein the first linked list and the second linked list are doubly linked lists linking in a double direction based on previous pointers and next pointers in the first and second linked lists.

18. The system of claim 17, wherein updating the first pointer or the second pointer includes updating the previous pointers and the next pointers in the first and second linked lists.

* * * * *